Figure 1:
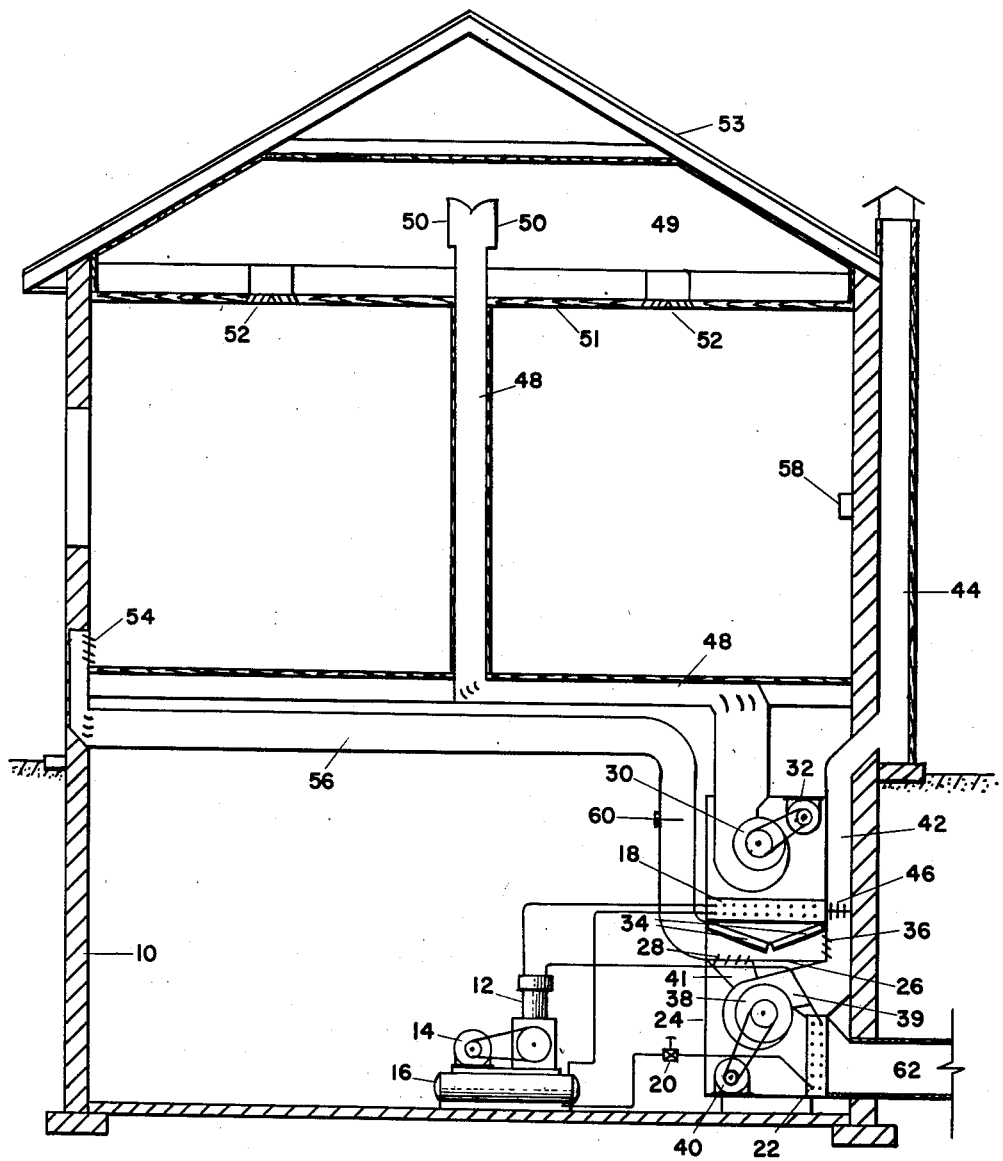

June 8, 1954  E. F. GYGAX  2,680,354
APPARATUS FOR HEATING AND COOLING
Filed March 16, 1949  4 Sheets-Sheet 1

INVENTOR
Ernest F. Gygax

ATTORNEY

June 8, 1954 E. F. GYGAX 2,680,354
APPARATUS FOR HEATING AND COOLING
Filed March 16, 1949 4 Sheets-Sheet 3

INVENTOR
Ernest F. Gygax
ATTORNEY

June 8, 1954     E. F. GYGAX     2,680,354
APPARATUS FOR HEATING AND COOLING
Filed March 16, 1949     4 Sheets-Sheet 4
FIG. 5
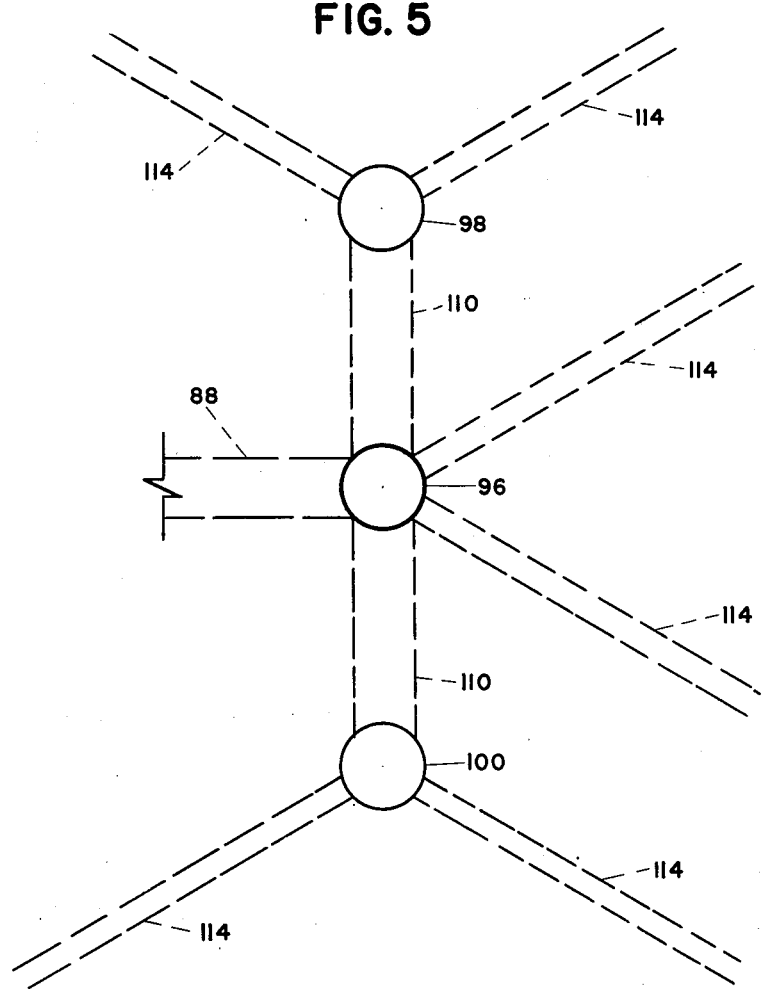
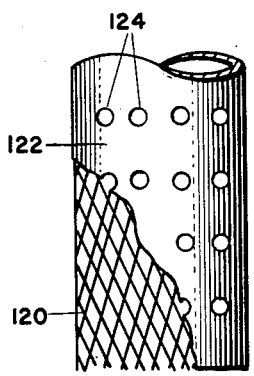
FIG. 6
INVENTOR
Ernest F. Gygax
Roy Eilers
ATTORNEY Patented June 8, 1954

2,680,354

UNITED STATES PATENT OFFICE 2,680,354

APPARATUS FOR HEATING AND COOLING

Ernest F. Gygax, St. Louis, Mo.

Application March 16, 1949, Serial No. 81,740

6 Claims. (Cl. 62—129)

This invention relates to improvements in methods and apparatus for heating and cooling. More particularly this invention relates to an improved method and apparatus for heating and cooling buildings and structures.

It is therefore an object of the present invention to provide an improved method and apparatus for heating and cooling buildings and structures.

In the heating and cooling of buildings and structures it is customary to circulate a warmed or cooled fluid through all or part of the buildings or structures and to recurrently add heat to or subtract heat from that fluid. That fluid will yield or absorb heat as it circulates through the building or structure, and will thus maintain the desired temperatures within the building or structure; and the yielded or absorbed heat of that fluid can be replenished or removed, respectively, by a heat-regulating device. In some instances the heat-regulating device will be a furnace wherein fuel is burned to provide heat for the circulated fluid, in other instances the heat regulating device will be an absorption cycle refrigeration unit, in certain instances the heat-regulating device will be a compression-expansion cycle unit that can be used for heating or cooling or both alternatively, and in still other instances the heat-regulating device will be a mixing chamber with a valve or damper to regulate the mixing of fluids at different temperatures. In each instance it is desirable to provide the required heating effect or cooling effect with the lowest initial and operating costs.

In certain instances it has been suggested that a compression-expansion cycle unit be used to heat or cool air which can be circulated through the building or structure to regulate the temperatures within that building or structure. Where the compression-expansion cycle unit is intended to heat the air circulated through the building or structure, the condensing coil of that unit will be disposed within the building or structure and will transfer heat to the air within the building or structure; the expansion coil of that unit being disposed in contact with a source of heat exterior of that building or structure. Conversely, where the compression-expansion cycle unit is intended to cool the air circulated through the building or structure, the expansion coil of that unit will be disposed within that building or structure and will absorb heat from the air within that building or structure; the condensing coil of that unit being in contact with a source of cooling effect exterior of that building or structure. One source of heat or cooling effect is water that has been circulated through containers or ducts embedded in the ground. The water will pass through the containers and ducts and absorb heat from or yield heat to the ground; the heat passing through the walls of the containers or ducts. For example, water in those embedded containers or ducts can, in winter, absorb heat from the ground and can, in summer, yield heat to the ground. Theoretically, the water passing through those embedded containers or ducts should be able, in winter, to absorb large quantities of heat from the ground and should be able, in summer, to yield large quantities of heat to the ground; and that water should be able to transfer that heat to or absorb that heat from the coils of a compression-expansion cycle unit. In actual practice, however, the rate of transfer of heat from the ground to the coil is seriously limited by the relatively small area of the containers or ducts, by the high thermal capacity of water, and by the need of successively transferring heat from the ground to the walls of the containers or ducts, from the walls of the containers or ducts to the water, and then from the water to the expansion coil of the compression-expansion cycle unit; and the rate of transfer of heat from the coil to the ground is seriously limited by the relatively small areas of the containers or ducts, by the high thermal capacity of water, and by the need of successively transferring heat from the condensing coil of the compression-expansion cycle unit to the water, from the water to the walls of the containers or ducts, and then from the walls of the containers or ducts to the ground. The reduction in the rate of heat transfer, due to these various factors, is additive in each case and is quite sizeable. For example, in many instances the reduction in heat transfer, due to the relatively small area of the containers or ducts, the high thermal capacity of water, and the need of successively transferring the heat from the ground to the walls of the containers or ducts and then from those walls to the water, is so great that the temperature of the water lags twenty (20) degrees Fahrenheit behind the temperature of the ground. This not the full measure of the reduction in the rate of heat transfer since the need of transferring the heat from the water to the expansion coil of the compression-expansion cycle unit additionally reduces the rate of heat transfer. As a result, the rate of heat transfer, attainable with water passing through containers or ducts embedded in the ground, is unsatisfactory. The use of water, in containers or ducts that are embedded within the ground, as a source of heat is additionally objectionable because the absorption of appreciable quantities of heat from the ground immediately adjacent the containers or ducts can cause that ground to freeze. Such freezing of the ground further retards the rate of heat transfer since the frozen ground tends to insulate the rest of the ground from the containers or ducts. Moreover, the water may itself freeze in the containers and ducts, thus preventing movement of that water. For these various reasons, the use of water that is heated or cooled by its passage through containers or ducts in the ground is objectionable. The present invention obviates these objections by drawing air through the ground, to heat or cool that air, and then conducting that air directly to a compression-expansion cycle unit. That air will directly contact the ground and absorb heat from that ground, and it can then transfer that heat directly to the expansion coil of the compression-expansion cycle unit; and conversely that air will, when cooled by direct contact with the ground, directly absorb heat from the condensing coil of the compression-expansion cyle unit. With such an arrangement there is no reduction in the rate of heat transfer due to the successive transfers of heat from the ground to the walls of a container or duct and then from those walls to the fluid within that container or duct; instead, that air directly contacts the ground and also serves as the heat transfer fluid. In addition, that arrangement obviates reductions in the rate of heat transfer due to small areas of contact between the ground and a heat transfer surface, such as the walls of a container or duct, because the air can find its way through, around or over large numbers of particles within the ground. Moreover, this arrangement avoids reductions in the rate of heat transfer due to the high thermal capacity of water. For these various reasons the drawing of air through the ground to heat or cool that air, and the use of that air to heat the expansion coil or to cool the condensing coil of a compression-expansion cycle unit provides an effective way of extracting or adding heat for cooling or heating purposes. It is therefore an object of the present invention to draw air through the ground to heat or cool that air and then conduct that air to a compression-expansion cycle unit.

The temperature of the ground above the "freeze line" varies considerably during the year, but the temperature of the ground below that line tends to vary only a little. This latter temperature tends to follow the average temperature of the water table in the ground, and the average temperature of the water table varies only a few degrees during the year. As a result, air drawn from the ground should be drawn through that portion of the ground below the "freeze line". Such air will have a high relative humidity, sometimes reaching the saturation point, because that air will absorb a great deal of moisture as it passes through the ground; and the high humidity of that air makes it difficult to use that air for ventilating purposes because the moisture in that air could condense on the walls of the building or structure. The present invention obviates any such condensation by using recirculated air as the primary air for ventilation and by using the ground air in controlling the condition of that recirculated air. With this arrangement, air having a high relative humidity can be used successfully; and the use of such air is desirable because high humidity air has a relatively high heat transferring capacity. It is therefore an object of the present invention to use recirculated air as the primary air for ventilation and to use air, passed through ground below "freeze line," in controlling the condition of the recirculated air.

The problem of drawing large quantities of air through the ground necessitates the provision of large areas of porous wall in contact with the ground. The present invention provides such large wall areas by embedding a number of porous-walled chambers within the ground and connecting them together. The use of a number of porous-walled chambers that are connected together makes it possible to reduce the size of each chamber; thus making it possible to employ rapid-acting digging equipment in forming the holes for those chambers. For example, where the individual chambers are small, power-driven augers can be used to form the holes in the ground that receive the chambers; and the use of such augers makes installation speedy and inexpensive. It is therefore an object of the present invention to provide a number of relatively small, interconnected, porous-walled chambers embedded within the ground.

In many instances, the ground will be sufficiently porous to permit ample quantities of air to be drawn into the porous-walled chamber or chambers. In some instances, however, the ground may consist of dense clays or may consist of rock; and in such instances, a quantity of gravel and sand should be placed between the walls of the chamber or chambers and the hole or holes in the clay or rock. Where this is done, the gravel and sand will transfer the heat of the clay and rock to the air. It is therefore an object of the present invention to provide a quantity of gravel and sand between the porous-walled chambers and the holes in the ground for those chambers.

Other and further objects and advantages of the present invention should become apparent from an examination of the drawing and accompanying description.

In the drawing and accompanying description, several preferred embodiments of the present invention have been shown and described but it is to be understood that the drawing and accompanying description are for the purposes of illustration only and do not limit the invention and that the invention will be defined by the appended claims.

Figure 2:
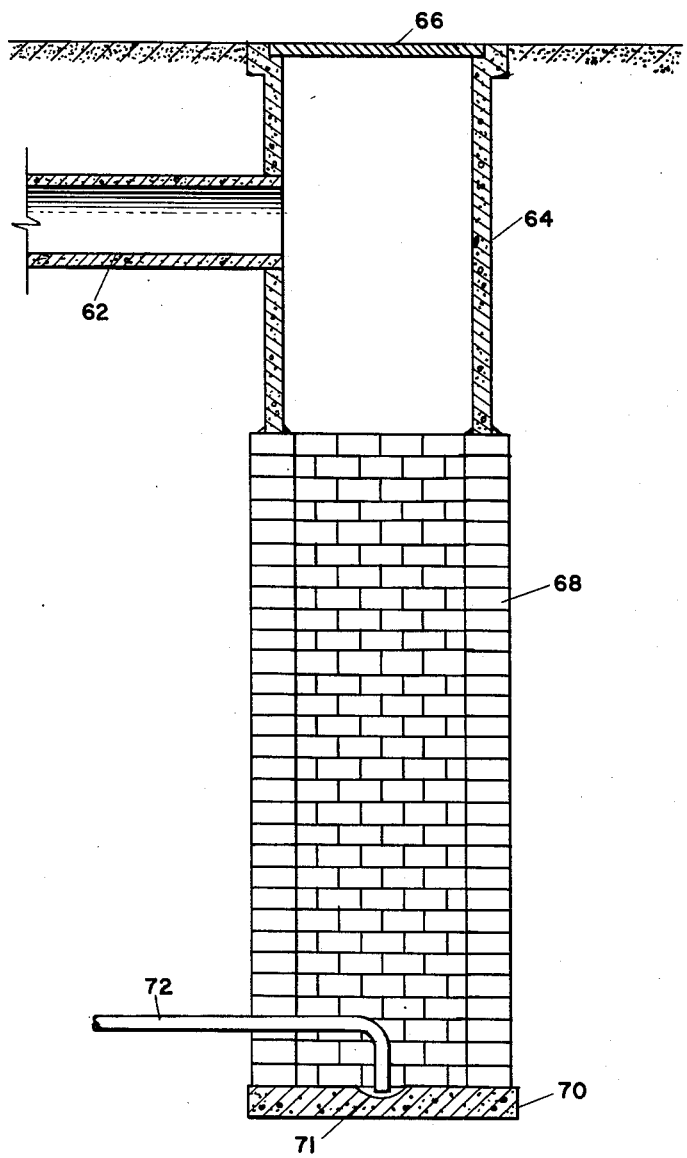
Figure 3:
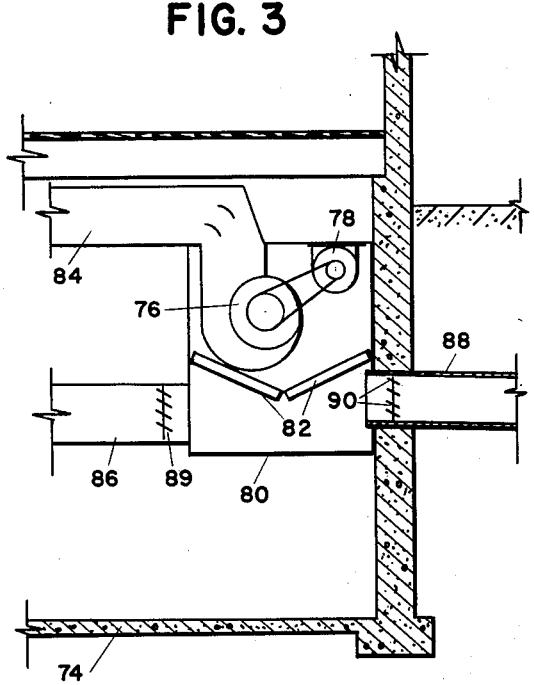
Figure 4:
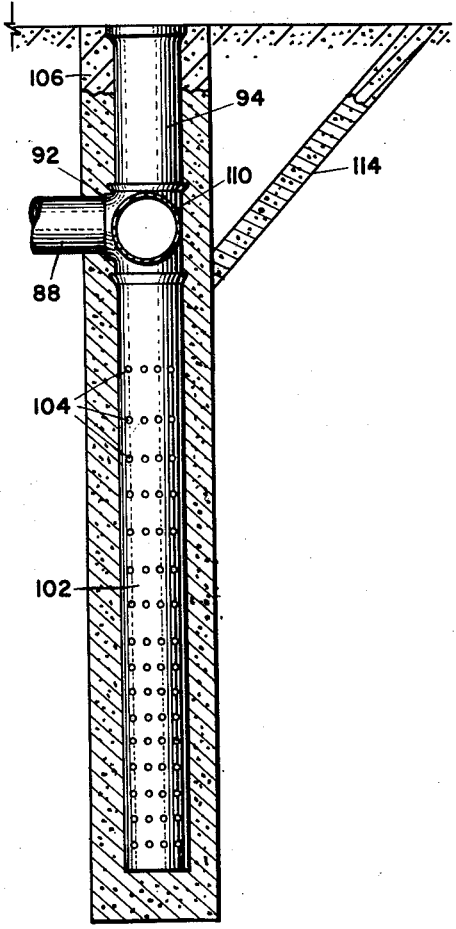

In the drawing, Fig. 1 is a schematic, cross-sectional view of a building with a heat-regulating device in the basement thereof, Fig. 2 is a schematic, cross-sectional diagram of a chamber embedded within the ground, Fig. 3 is a schematic, cross-sectional view of a portion of the basement of the building, Fig. 4 is a side elevational view of a preferred form of chamber embedded in the ground, Fig. 5 is a plan view of the chamber of Fig. 4 together with two similar chambers connected to that chamber, and Fig. 6 is a partially-broken, elevational view of a modified form of perforated wall for a chamber.

Referring to the drawing in detail, the numeral 10 denotes the basement of a building or structure which is heated and cooled by air. The numeral 12 denotes a compressor of the reciprocating type which is driven by a motor 14. The motor 14 is preferably operated electrically, but it can be operated on any suitable source of power. The compressor 12 and motor 14 are disposed above a receiver 16 which receives a fluid, such as methyl chloride, "Freon," or the like, after that fluid has passed from the high pressure side of the compressor 12 through a condensing coil 18. The fluid will then pass outwardly from the receiver 16 through an expansion valve 20 into an expansion coil 22. The expanded fluid will then be drawn back to the low pressure side of the compressor 12. Operation of the compressor 12 by the motor 14 will cause work to be exerted upon the fluid in the compression-expansion cycle unit, which consists of the compressor 12, condensing coil 18, receiver 16, expansion valve 20, and expansion coil 22; and the fluid passing into the condensing coil 18 will have a temperature above that of the fluid entering the low pressure side of the compressor 12.

The condensing coil 18 and the expansion coil 22 are enclosed within a casing 24 disposed adjacent one wall of the basement 10. A horizontally disposed partition 26 separates the casing 24 into upper and lower sections. A plurality of adjustable dampers 28 are provided in the partition 26; and those dampers can be opened to permit communication between the upper and lower sections of casing 24 or they can be closed to cooperate with partition 26 to separate the two sections of the casing. A blower 30, preferably of the multi-vane type, is disposed in the upper section of the casing 24; and that blower is driven by a motor 32, which motor is preferably electrically operated. A group of filters 34 are disposed below the condensing coil 18, and those filters abut each other so that all air entering the condensing coil 18 must first pass through those filters. With this arrangement, air drawn into the upper section of the casing 24 by the blower 30 will pass through the filters 34 and through the condensing coil 18 before it reaches that blower.

A plurality of dampers 36 are provided in the rear wall of the upper section of casing 24, and those dampers are disposed adjacent one of the filters 34 so that air drawn through those dampers 36 by the blower 30 will pass through the filters 34 before reaching that blower.

A blower 38, preferably of the multi-vane type, is disposed in the lower section of casing 24; and that blower is driven by a motor 40, which motor is preferably electrically operated. The intake of blower 38 confronts the expansion coil 22, and that blower draws air through that coil. The blower 38 has a principal outlet 39 connected to a duct 42 formed between the rear wall of the casing 24 and the nearby wall of the basement 10, and it has a secondary outlet 41 leading to the dampers 28. The duct 42 extends upwardly along the said wall of the basement 10 and connects with a stack 44 that is disposed adjacent the outside of the building erected above the basement 10. A plurality of adjustable dampers 46 are disposed in the duct 42, and they regulate the volume of air which can pass through that duct. The dampers 46 are disposed above the level of the dampers 36, and they can be closed to force air through the dampers 36. With this arrangement, air drawn through the expansion coil 22 by the blower 38 can be directed through dampers 28 into the upper section of casing 24, can be directed through duct 42 into the stack 44, or can be directed through duct 42 into the upper part of casing 24 through dampers 36, or a combination of any of these.

The outlet of the blower 30, in the upper section of casing 24, is directly in register with a duct 48 for conditioned air; and the duct 48 extends upwardly through the first floor of the building into a plenum chamber 49. This chamber is located above the ceiling 51 and below the roof 53 of the building. Outlets 50 are provided at the top of the duct 48, and conditioned air issues from those outlets into the plenum chamber 49. That air will then find its way downwardly from the chamber 49 through grilles 52 in the ceiling 51. The conditioned air issuing from the plenum chamber 49 through grilles 52 will circulate around between the ceiling 51 and the floor and will then be drawn through the outlet grilles 54 adjacent the floor. The air will then be drawn into return duct 56 disposed below the floor; and the end of that duct is in register with the lower portion of the upper section of casing 24. Air issuing from the end of return duct 56 will pass through filters 34 and condensing coil 18 before engaging the blower 30.

When the dampers 28 and 36 are closed, the blower 30 will recirculate air already within the building, and that air will ventilate the building. As the air passes over the condensing coil 18 it will be affected by the temperature of that coil, and as the air passes through the building it will affect the temperatures within that building. That air will act upon the roof thermostat 58, located on one of the walls of the building; and that thermostat can be used to control the energization and deenergization of the motors 14 and 40. For example, when the temperature of the air within the building falls below a predetermined value, the thermostat 58 can act to energize the motors 14 and 40, thus operating compressor 12 and blower 30. When the temperature in the building rises above the predetermined value, the thermostat 58 will denergize the motors 14 and 40.

The dampers 28 are preferably set so they are open part way; and where this is done, a small amount of air will be drawn through those dampers by the blower 30 whenever that blower is operating. This air will serve as "make up" air, and it will freshen the air circulated through the building. The setting of the dampers 28 should be such that only a small amount of "make up" air passes through those dampers, because the temperature conditions of the air within the building can sometimes be low enough to make the addition of much "make up" air undesirable. Under other temperature conditions of the air within the building, additional "make up" air is desirable, and that air can be drawn through the dampers 36. The amount of "make up" air drawn through dampers 36 should be regulated to avoid undue changes in the temperature and humidity of the air passing to the condensing coil 18; and that regulation is effected by an actuating mechanism, not shown, that responds to the thermostat 60 located in the return duct 56. The thermostat 60 and the actuating mechanism are set so the dampers 36 are closed whenever the temperature of the air adjacent thermostat 60 falls below a predetermined value, and so the dampers are open when the temperature of the air adjacent that thermostat is above that value.

The expansion coil 22 of the compression-expansion cycle unit is disposed immediately adjacent a duct 62 which extends through the wall of the basement 10 and extends outwardly into the ground around that basement. This duct extends to and communicates with a chamber which is disposed wholly within the ground. The chamber has a non-porous wall section 64 extending downwardly from the surface of the ground to a level below the "freeze line," and the duct 62 extends into that wall section. An airtight cover 66 is provided for the chamber, and it seats on a shoulder at the top of the non-porous wall section 64. A porous wall section 68 is provided for the chamber, and that wall section extends downwardly from the wall section 64. The wall section 68 is preferably made of loosely-laid brick; the loose laying of the brick providing a large number of small openings between the courses of brick and between the bricks in each course. The porous-wall section 68 is much longer than the non-porous wall section 64, and it is completely surrounded by the ground. The porous-wall section 68 of the chamber is supported upon a base 70 at the bottom of the chamber, and this base has a sump 71 into which the suction line 72 of a pump, not shown, extends. The pump can be selectively operated, in accordance with a timed cycle, a float-operated switch, or other mechanism to keep the chamber free of water that seeps in from the surrounding ground.

The duct 62 of Figs. 1 and 2 inclines downwardly through the ground from its connection with the non-porous wall section 64 to its connection with the casing 24, and it is substantially air-tight. The duct 62 may be made in sections and may have bends or curves, but the sections, bends and curves must be tightly sealed to each other so the duct 62 can direct air from the chamber within the ground to the casing 24 in the basement 10. With this arrangement, operation of the blower 38 will cause air to be drawn through the openings in the porous-wall section 68, then drawn upwardly into the imperforate section 64, and then finally drawn through the duct 62 to the casing 24. Some of this air will have been entrapped within the ground, having been forced into the ground by the winds and by changes in atmospheric pressure, and the rest of the air will be drawn down through the ground from the surface. All of that air will have a temperature closely approximating the temperature of the water in the water table; the air being heated or cooled as it passed through, over, or around the particles of earth in the ground. By having the non-porous wall section 64 extend below "freeze line," the present invention forces the air to pass through the warm sections of the ground before entering the chamber. In its passage through the ground, the air will pass through, over, or around a vast multitude of earth particles within the ground, and these particles provide an almost limitless heat transfer surface to the air, thus avoiding limitations in heat transfer rate due to small areas of heat transfer surface. The air can follow the lines of least resistance through the ground, and thus it can be moved through the ground with small expenditures of power.

The air passing upwardly into the non-porous wall section 64 will have a temperature close to the temperature of the ground, and the temperature of that air will approximate the temperature of the ground even more closely after that air has passed through the duct 62. At the time the air leaves the duct 62, that air can have a temperature close to fifty (50) degrees Fahrenheit and can have a relative humidity close to eighty seven percent (87%). That air will add heat to the expansion coil 22, and most of that air will then be expelled from the building through the duct 42 and stack 44. Part of the air can, depending upon the setting of the dampers 28 and 36, pass into the upper section of the casing 24 as "make up" air.

In its passage over the expansion coil 22, the air from the duct 62 transfers a good portion of its heat to the fluid within that coil, thereby raising the temperature of that fluid. The warmed fluid will then be drawn to the compressor 12, have work performed on it, and then be moved to the condensing coil 18 where it can yield a good portion of its heat to the air circulated by the blower 30. This air will be drawn from the return duct 56, will have "make up" air added to it, and will then be drawn through the filters 34 and the condensing coil 18 before being discharged into the duct 48. While passing through the condensing coil 18 this air will be heated considerably, and it will be sufficiently warm to heat the building.

The blower motor 40 and the compressor motor 14 will operate intermittently in response to thermostat 58, and the total expenditure of power in operating the motors 14 and 40 will be rather small because the temperature of the air in duct 48 need only be raised about thirty (30) degrees above the temperature of the air in duct 62. Such a rise in temperature is easily effected by the compression-expansion cycle unit.

Where the heat-regulating device is to be used to cool the building, the compressor 12 will be inactive; and the blowers 38 and 30 will admix enough of the cool ground air with the recirculated air to keep the temperatures of the air within the building at a comfortable value. The blower 38 will draw air into the casing 24 from duct 62 and will direct part of that air through dampers 28 and 36 into the upper section of the casing 24; and blower 30 will draw that air and the air from return duct 56 through filters 34 and direct the mixture into duct 48. The volume of ground air entering the upper section of the casing 24 will be controlled by the settings of the dampers 36 and 46; dampers 36 opening whenever the temperature of the air in the return duct 56 is high enough to actuate thermostat 60 and closing whenever the temperature of that air is below that value, and the dampers 46 being partially closed to create a slight air pressure adjacent dampers 36. While the relative humidity of the ground air may be high, the wet bulb temperature of that air will be lower than the wet bulb temperature of the recirculated air. As a result, by admixing ground air with the circulated air the present invention reduces the humidity temperature of the circulated air.

In the spring and fall, it may be desirable to draw atmospheric air into the building to ventilate it. In such instances the motors 14 and 40 will be inactive; the motor 32 operating to draw atmospheric air downwardly through the stack 44 and duct 42 into casing 24 through dampers 36. This air will admix with the recirculated air from return duct 56.

The heating and cooling effect obtainable from the ground by use of the present invention is quite large, as is shown by the following illustration of a cooling operation. A chamber with an inside diameter of seven and one half (7½) feet and an overall depth of eighteen (18) feet was embedded in soil which was dry and contained some gravel. The non-porous wall section 64 extended downwardly from the surface a total of six (6) feet, and the porous-wall section 68 extended down an additional twelve (12) feet.

The overall area of the porous-wall section 68 was two hundred and eighty two (282) square feet; and a five (5) horsepower blower motor 38 was able to draw two hundred and eighty six thousand (286,000) cubic feet of air through the porous-wall section 68 each hour. The temperature of the air within the non-porous wall section 64 ranged from fifty (50) to fifty two and one-half (52½) degrees Fahrenheit when the atmospheric temperature was seventy five (75) degrees Fahrenheit. The air within the chamber had a relative humidity of eighty seven percent (87%); providing a wet bulb temperature of forty eight (48) degrees Fahrenheit. The atmospheric air had a relative humidity of fifty percent (50%); providing a wet bulb temperature of sixty three (63) degrees Fahrenheit. The temperature of the air entering the casing 24 will be even closer to the temperature of the ground than is the air within the non-porous wall section 64, because the duct 62 will permit further heat exchange between the air and ground. The blower suction pressure was only six and three tenths (6.3) inches, but ample amounts of air flowed to that blower. The total heat derivable under these conditions was sixteen and six tenths (16.6) tons; and since it was obtained with a motor heat input of only one and forty two one hundreds (1.42) tons, the coefficient of performance of the cooling operation was eleven and six tenths (11.6). The cooling effect was such that when the cool ground air was mixed with the circulated air, the resulting mixture kept the building cool.

An equally remarkable coefficient of performance is obtainable when the ground air is used for heating; that air constituting a source of heat at an average temperature of fifty (50) degrees Fahrenheit. That air is drawn directly from the ground and it directly contacts the expansion coil of the compression-expansion cycle unit; thus avoiding reductions in heat transfer rates due to the use of a heat exchanging surface between the ground and the heat transfer medium. Moreover, by having a high relative humidity, the ground air has a satisfactory heat exchanging capacity.

A preferred form of porous-wall chamber is illustrated in Figs. 4 and 5; and that chamber can be connected to the basement 10 of Fig. 1 or the basement 74 of Fig. 3. The basement 74 has a blower 76 therein; and a motor 78, preferably an electric motor, is disposed adjacent blower 76 and is connected to operate that blower. The motor 78 and the blower 76 are enclosed within a casing 80 adjacent one side of the basement 74, and that casing contains filters 82 disposed below the intake of the blower 76. A conditioned-air duct 84 is connected to the outlet of the casing 80, and a return duct 86 is connected to the intake of the casing 80. The conditioned-air duct 84 will pass through various portions of the building and will discharge its air at various points. The return duct will gather in air at other points in the building and will return it to the casing 80. The casing 80 is in register with a duct 88 which extends through one wall of the basement and is embedded within the ground. The duct 88 is preferably made from sections of metal or concrete pipe; the sections interfitting to form tight joints. The duct 88 is provided with dampers 90, and those dampers regulate the volume of air drawn through the duct 88 by the blower 76. Dampers 89 are provided in the return duct 86, and proper setting of the dampers 89 and 90 will regulate the proportion of circulated and ground air drawn through the filters 82.

The opposite end of the duct 88 extends into and is connected with a five-way connector 92 embedded within the ground. Extending upwardly from the five-way connector 92 is an imperforate pipe 94 which is provided with an air tight cover 96. Extending downwardly from the five-way connector 92 is a perforated pipe 102, which pipe has a large number of small holes 104 therein. These holes are dimensioned so they permit ready entrance of air into the pipe 102 but will prevent the entrance of earth or gravel. The pipe 94 and the pipe 102 fit the connector 92 tightly so that little or no air can pass through the joints between those pipes and that connector.

Extending outwardly from the sides of the five-way connector 92 are connecting ducts 110; and each of the ducts 110 extends to a chamber which is similar to but spaced from the central chamber. The side chambers differ from the central chamber in having T-connectors instead of the five-way connector 92. One of the two side chambers has an air-tight cover 98 and the other side chamber has an air-tight cover 100. Air can be drawn through the holes in the perforate pipes 102 of each of the three chambers, through the connecting ducts 110 from the side chambers, and then through the duct 88. This air will have a temperature closely approximating the temperature of the ground, and it can be used for cooling the building or can be used as "make up" air. The arrangement shown in Fig. 3 is principally useful where the temperature is always warm, and in such cases the ground air will be used for its cooling effect. In climates where heating as well as cooling is required, the arrangement of Fig. 1 is preferred.

The three chambers are disposed in vertically-disposed holes or shafts 106 formed in the ground; and those holes can be formed conveniently by a power-driven auger or other hole-forming equipment. Because the holes 106 can be formed with power-driven equipment, the installation of the chambers is an inexpensive procedure. The holes 106 are made considerably larger than the outside diameters of the pipes 94 and 102, and the spaces between the outside surfaces of the pipes 94 and 102 and the inside surfaces of the holes 106 are filled with earth. Where the ground in which the holes 106 are formed is relatively porous, the excavated earth can be replaced around the pipes 102. However, where the ground in which the holes 106 are formed is a dense clay or rock, a porous mixture of gravel and dirt or sand and dirt should be placed around the pipes 102. In each case the earth of the top of the hole will be tamped to make it less porous. Where the ground is relatively porous, air will be drawn through the undisturbed as well as the replaced earth; but where the ground is dense clay or rock, the air will be drawn principally through the dirt and gravel filling the hole 106. That dirt and gravel will be heated or cooled by the surrounding ground and will in turn heat or cool air passing through it.

Where the hole 106 is formed in rock, a plurality of angularly disposed shafts or holes 114 can be formed in the rock; those shafts extending down from the surface to a point intermediate the top and bottom of the shafts 106. The shafts 114 can be filled with a mixture of dirt and gravel or dirt and sand, and the mixture will be tamped at the outer ends of the shafts. The mixture will be pervious to air and will require that air to follow tortuous paths and thereby come into intimate contact with a large number of earth particles of large surface-to-volume ratio. The air which reaches the pipes 102 will thus have attained a temperature closely approximating the temperature of the ground.

An alternate form of perforated pipe, usable in the chambers of Figs. 4 and 5, is shown in Fig. 6. This pipe is formed by coating metal lath 120 with a layer of cement 122. The coating 122 will, because of the porosity of the lath 120, have a number of openings 124 therein. Although shown as perfect circles, the openings 124 will be largely irregular in form; the shape of the openings being determined by the "flow" of the cement as the coating 122 is applied. This coating can easily be applied by spraying the lath 120 with cement or dipping that lath in cement. Such a pipe can be made cheaply and simply, and it will have the required strength and the required resistance to rust and corrosion.

If the three chambers are set in ground where excessive seepage is anticipated, the bottoms of the chambers can be connected to suitable sewer connections by a drain or can be provided with sump pumps. In these ways the chambers can be kept free of water.

More than three chambers can be provided; it only being necessary to connect the added chambers to the duct 83 or to a duct 110. This can easily be done by T-junctions and feeder ducts or by other suitable means. The use of a number of small chambers in place of one large chamber is desirable for several reasons. In the first place the cost of forming a number of small holes in the ground is less than the cost of forming one large hole in the ground, in the second place the cost of making a number of small chambers is less than the cost of making one large chamber, in the third place the smaller chambers can be used where bed rock is encountered close to the surface, and in the fourth place the plurality of chambers draw air more readily from a larger volume of ground than the single chamber could.

Where the ground adjacent the building is exceedingly moist, a deep bed of cinders should be provided within the ground and the chamber should be long and shallow. The top of the chamber would be inperforate while the bottom would be of loosely laid brick; and the cinders would permit water to drain away from the chamber. Sump pumps could also be provided if they were needed. The air would be drawn down through the ground surrounding the chamber and would be heated or cooled by that ground. A suitable underground duct would conduct that air to the building.

One of the principal problems encountered in cooling buildings or structures is the problem of high relative humidity. The relative humidity of the air within buildings or structures tends to increase due to the moisture in the air breathed out by the occupants, the moisture evaporated from the skin surfaces of the occupants, and the vapors from cooking and like operations. Unless the tendency toward increased relative humidity is compensated for, the relative humidity of the air within the building or structure can become so high that the occupants will be uncomfortable. In many instances the problem of high relative humidity is compensated for by passing the air over the surfaces of an expansion coil of a compression-expansion cycle unit, thereby causing the moisture in that air to condense on that coil. However, to do this, the compression-expansion cycle unit must extract the heat of vaporization from the moisture in the air, and this requires the expenditure of considerable power. The present invention compensates for high relative humidity, without the power expenditures required by the compression-expansion cycle unit, by admixing the ground air with the recirculated air within the building. Although the ground air may have a high relative humidity when drawn from the ground, it will have a wet bulb temperature that is lower than the wet bulb temperature of the recirculated air; and consequently, when the ground air and recirculated air are properly admixed, the resulting mixture will have the desired low relative humidity.

For example, where one (1) part of ground air with a dry bulb temperature of fifty two and one half (52½) degrees Fahrenheit and a wet bulb temperature of only forty eight (48) degrees Fahrenheit is mixed with three (3) parts of recirculated air having a dry bulb temperature of seventy five (75) degrees Fahrenheit and a wet bulb temperature of sixty (60) degrees Fahrenheit, the resulting mixture has a dry bulb temperature of seventy (70) degrees Fahrenheit and a wet bulb temperature of about fifty seven (57) degrees Fahrenheit. This means a relative humidity of about forty seven per cent (47%), a value well within the comfort zone. Where equal parts of that ground air and recirculated air are admixed, the resulting mixture has a dry bulb temperature of sixty three and one half (63.5) degrees Fahrenheit and a wet bulb temperature of fifty four and two tenths (54.2) degrees Fahrenheit; and this provides a relative humidity of about fifty four per cent (54%), a value well within the comfort zone.

In most instances the temperature of the ground air will be low enough so that when the ground air is admixed with recirculated air the resultant mixture can cool a building. In some instances, however, the air temperatures within the building must be unusually low or the relative humidity of the recirculated air will be unusually high, and in those instances all or part of the ground air will be used to extract heat from the condensing coil of a compression-expansion cycle unit and will then be expelled from the building. The air circulated within the building can then be cooled and dehumidified by contact with the expansion coil of the compression-expansion cycle unit; and that air, either alone or admixed with an untreated part of the ground air, can be used for cooling. Such an arrangement can be used with considerable economy because the ground air is an inexpensive source of cooling effect.

Whereas several preferred embodiments of the present invention have been shown and described in the drawing and accompanying description it should be obvious to those skilled in the art that various changes may be made in the form of the invention without affecting the scope thereof.

What I claim is:

1. A heat-regulating device, adapted to be used within a building, that comprises a casing, a partition dividing said casing into two sections, a blower in one section of said casing, a conditioned-air duct that is in register with the outlet of said blower and extends from said one section of said casing, a return duct extending to said one section of said casing, a blower in the other section of said casing, an air inlet duct extending from a porous-wall chamber in the ground to said other section of said casing, an exhaust duct extending from said other section of said casing to an exhaust outlet of said building, a coil of a compression-expansion cycle unit disposed in said one section of said casing between said return duct and said blower, a second coil of said compression-expansion cycle unit disposed in said other section of said casing between said inlet and exhaust ducts, a compressor, and dampers between said one and said other sections of said casing, said dampers being openable to provide "make up" air for said one section of said casing.

2. A heat-regulating device, adapted to be used within a building, that comprises a casing, a partition dividing said casing into two sections, a blower in one section of said casing, a conditioned-air duct that is in register with the outlet of said blower and extends from said one section of said casing, a return duct extending to said one section of said casing, a blower in the other section of said casing, an air inlet duct extending from a porous-wall chamber in the ground to said other section of said casing, an exhaust duct extending from said other section of said casing to an exhaust outlet of said building, a coil of a compression-expansion cycle unit disposed in said one section of said casing between said return duct and said blower, a second coil of said compression-expansion cycle unit disposed in said other section of said casing between said inlet and exhaust ducts, and a compressor, said blower in said other section of said casing being adapted to draw air from said chamber in the ground, pass said air through said expansion coil, and then directly expel that air from the building.

3. A heat regulating device, adapted to be used within a building, that comprises a casing, a partition dividing said casing into two sections, a blower in one section of said casing, a conditioned-air duct that is in register with the outlet of said blower and extends from said one section of said casing, a return duct extending to said one section of said casing, a blower in the other section of said casing, an air inlet duct extending from a porous-wall chamber in the ground to said other section of said casing, an exhaust duct extending from said other section of said casing to an exhaust outlet of said building, a coil of a compression-expansion cycle unit disposed in said one section of said casing between said return duct and said duct for conditioned air, a second coil of said compression-expansion cycle unit disposed in said other section of said casing between said inlet and exhaust ducts, and a compressor, said compression-expansion cycle unit being adapted to transfer heat from said one section to the other.

4. Apparatus for heating a building that comprises the expansion coil of a compression-expansion cycle unit, an enclosure for said expansion coil, a porous-wall chamber embedded within the ground outside of said building, a duct extending through the ground and connecting said chamber with said enclosure, a duct extending from said enclosure to an exhaust outlet of said building, a blower to draw air into said chamber from the ground, to pass said air over said expansion coil, and to direct said air outwardly of said building through said exhaust outlet, a condensing coil of said compression-expansion cycle unit, an enclosure for said condensing coil, a second blower to move air through the enclosure for said condensing coil, and a compressor to move fluid from said expansion coil to said condensing coil, said enclosures being adjacent each other and having a common wall, said expansion coil absorbing heat from said air and said compressor moving that heat to said condensing coil for dissipation to the air moving through the second said enclosure.

5. The combination of a building, a heat-regulating device within said building, a chamber disposed within the ground exteriorly of said building, a duct extending between said chamber and said heat-regulating device, an air-moving device, said chamber having a lower section that is pervious to air, said air-moving device being adapted to draw ground air into said chamber through the lower section of said chamber and to move said air through said duct to said heat-regulating device, said air being heated or cooled in the ground and constituting a fluid heat exchange medium, a second air-moving device adapted to circulate air through said building, a wall between said air-moving devices, and openings in said wall to permit a portion of said ground air to admix with said circulated air, the rest of said ground air being adapted to heat or cool a portion of said heat-regulating device.

6. The combination of a building, a heat-regulating device that is within said building and that has a plurality of sections, a chamber disposed within the ground exteriorly of said building, a duct extending between said chamber and one of the sections of said heat-regulating device, and an air-moving device, said chamber having a lower section that is pervious to air, said air-moving device being adapted to draw air from the ground into said chamber through the lower section of said chamber and to move said air through said duct to the one said section of said heat-regulating device, said air being heated or cooled in the ground and constituting a fluid heat exchange medium, a second air-moving device adapted to move air through another section of said heat-regulating device, said first and said second sections of heat-regulating device having a wall therebetween that largely separates said sections but permits some of the air from said second section to enter the first said section, whereby said heat-regulating device acts as a mixing chamber to admix ground air from said chamber with air within said building.

References Cited in the file of this patent

UNITED STATES PATENTS

| Number | Name | Date |
|---|---|---|
| 218,101 | Wilkinson | July 29, 1879 |
| 2,008,407 | Stoever | July 16, 1935 |
| 2,074,283 | Stauber | Mar. 16, 1937 |
| 2,119,038 | Bell | May 31, 1938 |
| 2,130,606 | Wanamaker | Sept. 20, 1938 |
| 2,178,176 | Lamm | Oct. 31, 1939 |
| 2,242,378 | Wollbach | May 20, 1941 |
| 2,301,073 | Newton | Nov. 3, 1942 |
| 2,355,469 | Robertson | Aug. 8, 1944 |
| 2,376,859 | Benn | May 29, 1945 |
| 2,428,876 | Hawkins | Oct. 14, 1947 |
| 2,468,626 | Graham | Apr. 26, 1949 |
| 2,484,371 | Bayston | Oct. 11, 1949 |

OTHER REFERENCES

House Heating With Earth Heat, by A. C. Crandall (Electrical World, November 9, 1946.)